United States Patent Office.

ALFRED B. ELY, OF NEWTON, MASSACHUSETTS.

Letters Patent No. 74,901, dated February 25, 1868.

IMPROVEMENT IN SHOE-TIPS.

*The Schedule referred to in these Letters Patent and making part of the same.*

Be it known that I, ALFRED B. ELY, of Newton, in the State of Massachusetts, have invented a new and useful Shoe-Tip, of which the following is a description.

Shoe-tips have been made of metal, of leather, and of rubber.

My invention consists in making them of a composition of hard resins or resinous substances, and fibrous materials mixed, and formed and moulded by means of heat and pressure; and also in making them of felted or textile materials saturated, or saturated and coated with any suitable substance, which will impart to the article when shaped by heat and pressure the proper hardness and elasticity.

The resin and fibre may be mixed in any suitable proportion, according to the quality of the material used, to give the compound the proper tenacity and hardness, and then, while warm, spread, rolled, or ground between rolls into sheets, and then cut in proper sizes and pressed into shape in heated moulds, or the fibrous material in sheets, or in the form of a textile, or woven, or felted fabric, may be thoroughly saturated, or saturated and coated with the resin or resinous gum, either pure or mixed with fibre, and then proper-sized pieces of this shaped in heated moulds by proper pressure. The degree of heat may be regulated by the kind of article wanted for use. Sometimes it may be warmed or heated, and pressed in moulds of the required shape, and in some cases it will answer to be pressed without heat. Felted and woven fabrics may be used saturated, or saturated and coated with any suitable material, so that the article when properly pressed and heated, or heated and pressed in moulds, will assume the proper shape, and acquire or possess the proper hardness and elasticity. A mixture of rubber and paraffine may be found useful for some kinds.

What I claim in manufacturing shoe-tips, is—

1. The use of resinous bodies, combined with fibrous material, and shaped by means of heat and pressure, substantially as described.

2. I also claim a shoe-tip made of the foregoing substances, and formed into shape by means of suitable pressure, with or without heat, substantially as described.

3. I also claim a shoe-tip made of felted or woven material saturated with resinous substances, or prepared rubber, which, when properly heated and pressed in moulds, will assume the proper shape, and acquire or possess the proper hardness and elasticity, substantially as described.

In testimony whereof, I have hereunto subscribed my name.

ALFRED B. ELY.

Witnesses:
W. M. PARKER,
GEO. B. BLODGETTE.